United States Patent
Awedikian et al.

(10) Patent No.: US 8,612,171 B2
(45) Date of Patent: Dec. 17, 2013

(54) METHOD OF AUTOMATICALLY FORMULATING TEST CASES FOR VERIFYING AT LEAST PART OF A PIECE OF SOFTWARE

(75) Inventors: Roy Awedikian, Mount Lebanon (LB); Bernard Yannou, Marcoussis (FR); Philippe Lebreton, Ancenis (FR); Line Bouclier, Pontoise (FR); Mounib Mekhilef, Soulagnis (FR)

(73) Assignee: Johnson Controls Technology Company, Holland, MI (US)

( * ) Notice: Subject to any disclaimer, the term of this patent is extended or adjusted under 35 U.S.C. 154(b) by 381 days.

(21) Appl. No.: 12/993,251

(22) PCT Filed: May 19, 2009

(86) PCT No.: PCT/EP2009/003566
§ 371 (c)(1),
(2), (4) Date: Apr. 4, 2011

(87) PCT Pub. No.: WO2009/149815
PCT Pub. Date: Dec. 17, 2009

(65) Prior Publication Data
US 2011/0184689 A1   Jul. 28, 2011

(30) Foreign Application Priority Data
May 19, 2008   (DE) .................. 10 2008 024 170

(51) Int. Cl.
*G06F 19/00*   (2011.01)

(52) U.S. Cl.
USPC .......................................................... 702/123

(58) Field of Classification Search
USPC .......................................................... 702/123
See application file for complete search history.

(56) References Cited

U.S. PATENT DOCUMENTS 6,189,116 B1   2/2001   Mongan et al.

2004/0154001 A1   8/2004   Haghighat et al.

FOREIGN PATENT DOCUMENTS

WO   WO 2006/007588 A2   1/2006

OTHER PUBLICATIONS

James C. Spall, Monte Carlo Computation of the Fisher Information Matrix in Nonstandard Settings, 2005 American Statistical Association, Institute of Mathematical Statistics, and Interface Foundation of North America Journal of Computational and Graphical Statistics, vol. 14, No. 4, pp. 889-909.*

(Continued)

*Primary Examiner* — Tung S Lau
(74) *Attorney, Agent, or Firm* — Foley & Lardner LLP

(57) ABSTRACT

A method of automatic formulation by a computer of test cases for verifying at least one function of a piece of software in relation to a specification including requirements relating input values and output values of the software, the method including the steps of:
distinguishing combinatorial requirements and sequential requirements;
modeling combinatorial requirements by a truth table and sequential requirements by a finite state machine to obtain a modeled specification;
establishing an operation matrix relating the input values of the software with a probability of them being in succession and a transition time between them;
selecting the successions of input values to be tested by performing a Monte Carlo draw on the operation matrix;
determining a test case including test rows relating each selected succession with the output values expected given the modeled specification;
stopping the determination process when the test case being determined makes it possible to reach a predetermined threshold for at least one of the following criteria: verified percentage of function code, verified percentage of requirements, verification time, and verification cost.

8 Claims, 9 Drawing Sheets

(56) References Cited

OTHER PUBLICATIONS

Bringmann E et al, "Model-Based Testing of Automotive Systems," International Conference on Software Testing, Verification, and Validation, dated Apr. 9, 2008, pp. 485-493, Piscataway, NJ, USA.

Prowell, S J: "A cost-benefit stopping criterion for statistical testing," Proceedings of the 37th annual Hawaii international conference on systems sciences, dated Jan. 5, 2004, Piscataway, NF, USA, 6 pages.

Trammell, C., "Quantifying the reliability of software: statistical testing based on a usage model," Software Engineering Standards Symposium, dated Aug. 21, 1995, pp. 208-218, Montreal, Canada.

International Search Report and Written Opinion for PCT/EP2009/003566, dated Sep. 17, 2009, 12 pages.

Preliminary Report on Patentability for PCT/EP2009/003566, dated Dec. 6, 2010; 10 pages.

\* cited by examiner

METHOD OF AUTOMATICALLY FORMULATING TEST CASES FOR VERIFYING AT LEAST PART OF A PIECE OF SOFTWARE

FIELD OF THE INVENTION

The invention relates to a method of formulating test cases for functional testing of a software product.

BACKGROUND OF THE INVENTION

Over the last few years electronics has taken a dominant place in automobile vehicle design. The electronic architectures of automobile vehicles are therefore becoming more and more complex and automobile vehicle manufacturers subcontract the design of the electronic modules to automobile vehicle electronics suppliers. These electronic modules generally include a processor executing software and many of the faults found in these modules are software errors, known as bugs.

The discovery of a bug early on in the software development cycle and the reduction of the number of bugs discovered by the automobile vehicle manufacturer or the vehicle user is a priority objective for automobile vehicle subcontractors.

Until now it has been usual for software test engineers to formulate software test cases manually on the basis of their personal knowledge, with the result that the quality of the test cases depends on each individual software test engineer.

OBJECT AND SUMMARY OF THE INVENTION

An object of the invention is thus to automate the formulation of test cases for functional testing of software, a software component or a software product so that, by eliminating the problem referred to above, it is possible to detect software bugs more reliably than in the prior art.

To this end, the invention provides a method of automatic formulation by a computer of test cases for verifying at least one function of a piece of software in relation to a specification including requirements relating input values and output values of the software, the method including the steps of:

distinguishing combinatorial requirements and sequential requirements;
modeling combinatorial requirements by a truth table, for example, and sequential requirements by a finite state machine, for example, to obtain a modeled specification;
establishing an operation matrix relating the input values of the software with a probability of them being in succession and a transition time between them;
selecting the successions of input values to be tested by performing a Monte Carlo draw on the operation matrix;
determining a test case including test rows relating each selected succession with the output values expected given the modeled specification;
stopping the determination process when the test case being determined makes it possible to reach a predetermined threshold for at least one of the following criteria: verified percentage of function code, verified percentage of requirements, verification time, and verification cost.

The proposed processing of requirements and the formulation of the operation matrix makes automation of the method of the invention by computer possible with a minimum of human intervention. This results in an improvement in bug detection performance, a reduction in the time needed to verify the function, and a correlated reduction in verification cost.

Other features and advantages of the invention emerge from the following description of particular non-limiting implementations of the invention.

BRIEF DESCRIPTION OF THE DRAWINGS

Reference is made to the appended drawings, in which:
FIGS. 4 and 5 are charts showing equal probability operational matrices.

MORE DETAILED DESCRIPTION

Figure 1:
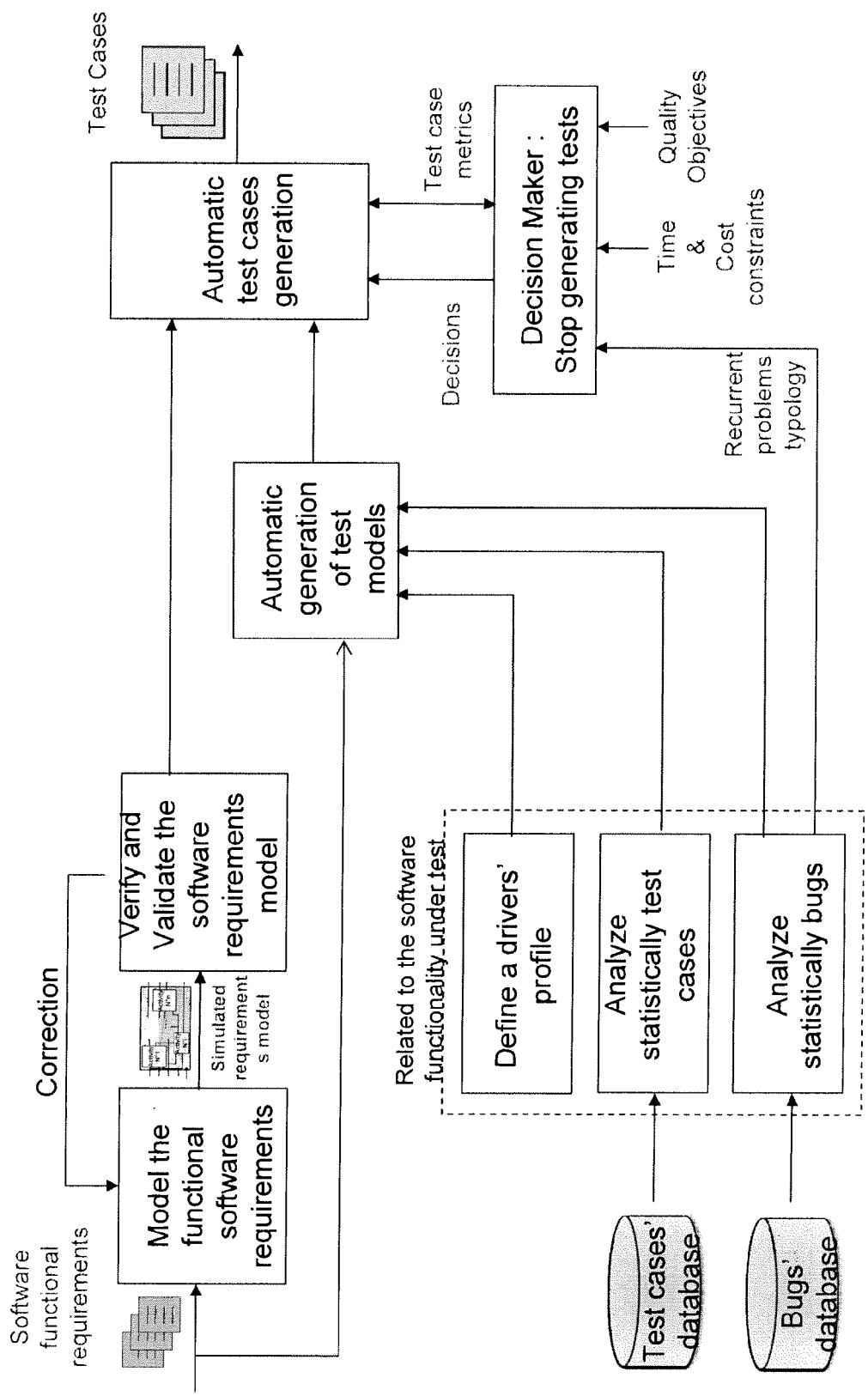
FIG. 1 is a block diagram of the principle of the invention.

Generally speaking, an important aspect of the invention proposes an integrated approach to generating test cases for functional testing of a software component or product that is intended in particular for use in the automotive field.

This method enables a computer to formulate test cases automatically for verifying at least one software function against a specification including requirements relating input values and output values of the software.

One implementation of the invention bases this approach on one or more of the following features a) to g):
a) a model for representing the functional requirements of a piece of software;
b) an application frame for creating a driver profile;
c) an application frame for recovering bugs detected in the past and test cases relating to previous projects;
d) an application frame for extending the software specification model using statistical data relating to critical requirements (recurrent control input or driver action, recurrent bugs, feedback);
e) a target function based on the quality of the software (its structural and functional coverage) and the cost of the test cases generated;
f) a test algorithm based on a Monte Carlo simulation of the input fields of the function under test; and
g) a heuristic optimization algorithm for optimizing the formula representing the target function during automatic generation of test cases.

Other information relating to the invention is given in the following analyses, numbered 1) to 3), on which the integrated approach and the corresponding computer platform are based:

1) Modeling software requirements: current software requirement models are developed for a given industrial or academic context. In the automotive industry there is no unified model for representing software requirements. Automobile vehicle manufacturers hand over formalized requirements to their suppliers and the suppliers concerned must adapt their processes to the formalized requirements of the automobile vehicle manufacturers. A model for representing the software requirements is therefore proposed taking account of the automobile vehicle application and its limits. Each software function has a set of input signals, intermediate signals, and output signals. The signals are linked together by elements. An element is a set of functional requirements of the same type. Two types of functional requirement are proposed at a first level (in a combinatorial or sequential manner) that can be modeled on the basis of two types of modeling elements, a decision table (DT) and a finite state machine (FSM).

2) Concentration on critical tests to be effected because they present a high probability of discovering a bug: an analysis of all bugs that have been discovered by automobile vehicle manufacturers or vehicle users has shown that certain driver-oriented control inputs or actions are required to bring some of these bugs to light. Moreover, in the automobile vehicle field the use of bugs detected in the past and of test cases developed in the past is highly advantageous, given that more than half of the functionality of a given software product is common to each series of vehicles. Thus two application frames are proposed, an application frame for modeling the behavior of the driver when using a specific software function and another application frame for reusing data exploited in the past for a given function. Moreover, a structure is proposed for superimposing statistical data on the requirements model, said data relating to the behavior profile of the driver of the vehicle and to the use of experience relating to the detection of bugs in similar products. This extension of the requirements model further enables tests to be generated that are relevant in terms of their probability of discovering existing bugs.

3) Surveillance of automatic test generation by means of quality indicators: software tests are often based on specific hypotheses and targets that assist software test engineers to decide when a test protocol must be terminated. For monitoring the generation of test cases, a target function is proposed that is based on quality indicators, for example the formal structural or functional coverage and the cost of the tests generated. An interface window is also proposed that enables the software tester to define a precise target prescription for these three subsets of quality indicators. Consequently, a heuristic optimization algorithm aims to optimize the target function while generating test cases by Monte Carlo simulation in the input field.

Referring to the figures, in one particular implementation of the invention the method, of general principle that is shown in FIG. 1, begins with a stage of modeling the specification.

The specification includes requirements Req relating input values and output values of the software function to be verified. Here there are three inputs I and two outputs O:

input I1 has possible values 0, 1;
input I2 has possible values 1, 2, 3;
input I3 has possible values 0, 1.

Figure 2:
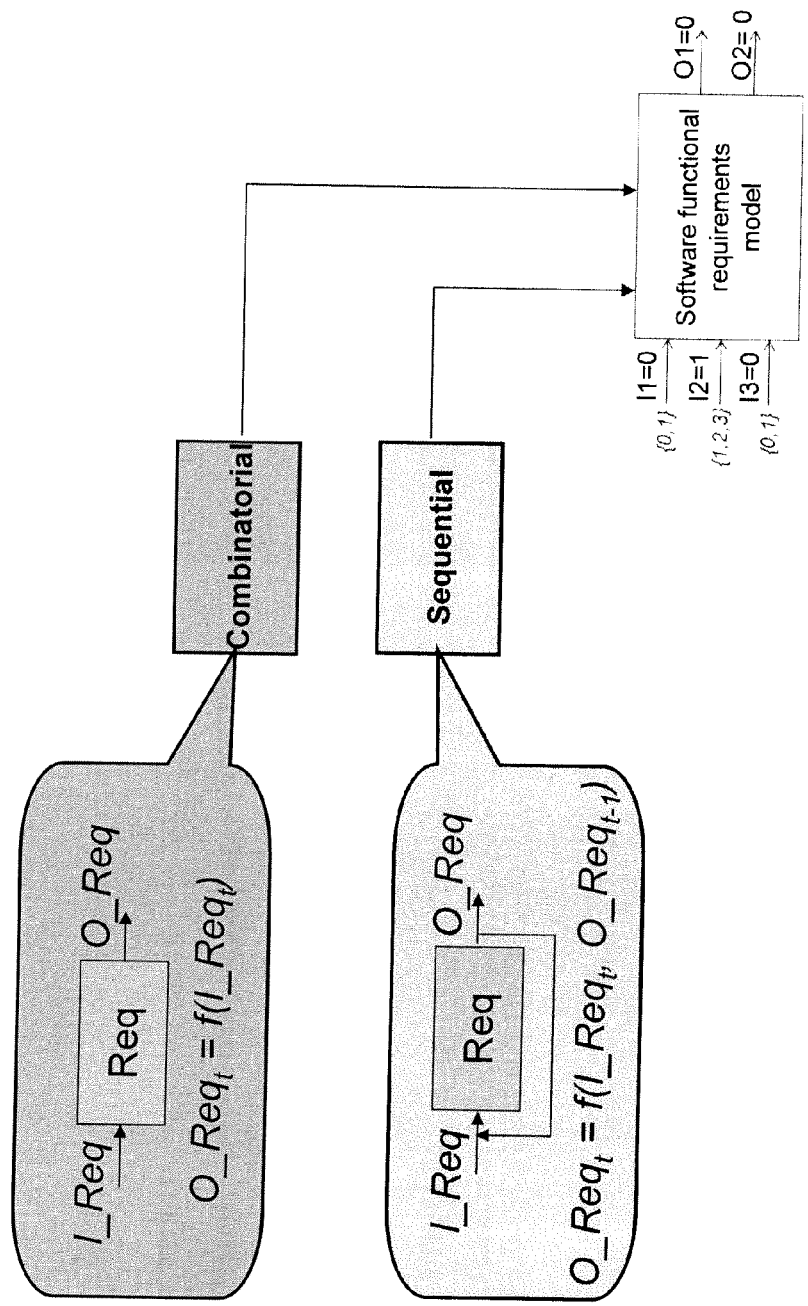
FIG. 2 is a block diagram of the process of formulating the modeled specification.

This stage includes the step of distinguishing between combinatorial requirements and sequential requirements in the specification (FIG. 2). A requirement is combinatorial when an output O depends on an input I: $O_{Req(t)}=f(I_{Req(t)})$. A requirement is sequential when, at a time t, an output O depends on the input I at the time t and the output O at an earlier time: $O_{Req(t)}=f(I_{Req(t)}, O_{Req(t-1)})$.

Then combinatorial requirements are modeled automatically by a truth table or decision table and sequential requirements are modeled by a finite state machine (combining starting states, finishing states, and transitions between them that may be subject to conditions). This makes it possible to obtain a modeled specification of requirements that can be simulated. The modeled specification is preferably then tested and validated to be sure that it is a good match to the initial specification.

Figure 3:
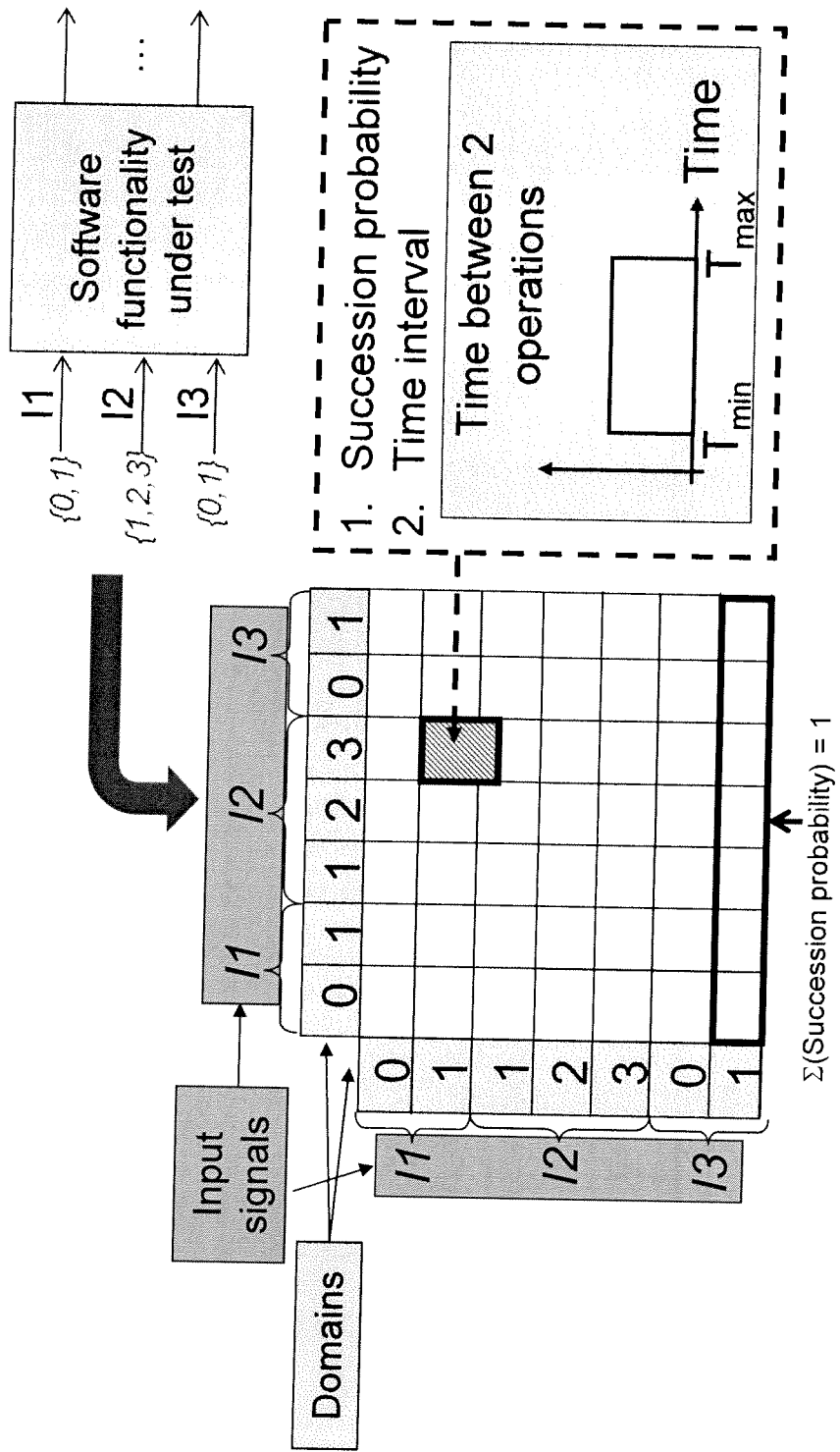
FIG. 3 is a block diagram of the principle of constructing an operation matrix using the invention.

An operation matrix is then drawn up relating the input values of the software, a probability of them being in succession, and a transition time between them (see FIG. 3). The operation matrix comprises as many rows and columns as there are possible values (for example: 0, 1; 1, 2, 3) of the inputs (I1, I2, I3), each row corresponding to an input value and each column also corresponding to an input value. All the inputs and their possible values are represented in these rows and columns. Each row and column intersection contains a probability that the column input value succeeds the row input value (the sum of the probabilities for the same row being equal to 1) and a time or a time range necessary for the column input value to succeed the row input value. This is referred to as input value succession.

Here five operational matrices are produced.

Figures 4, 5:
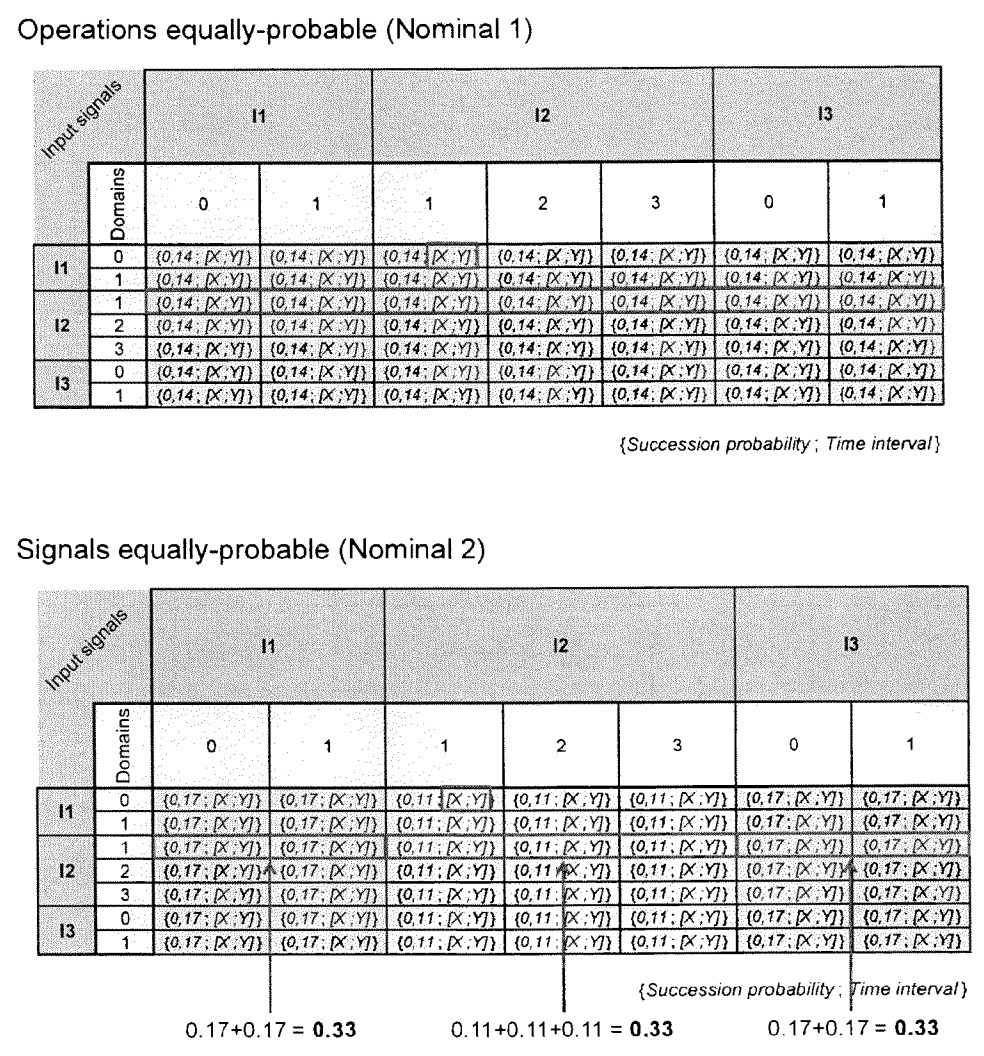

In the first operation matrix (FIG. 4), an input value may be succeeded by any input with the same probability. All successions thus have the same probability of occurring regardless of the inputs.

In the second operation matrix (FIG. 5), an input value may be succeeded by any input with the same probability. All successions have the same probability of occurring in each input succeeding an input value.

Figure 6:
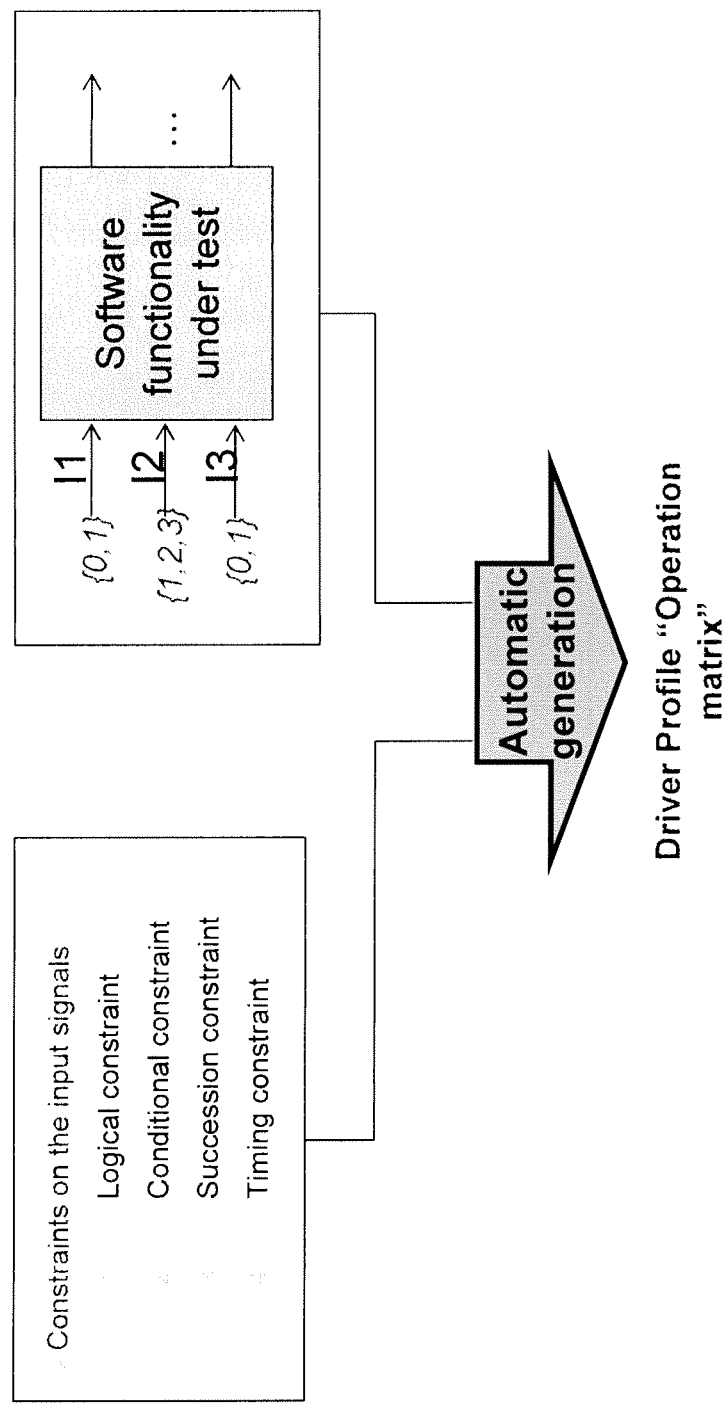
FIG. 6 is a chart showing the operation of formulating an operation matrix linked to the user profile.

The third operation matrix (FIG. 6) is obtained by determining a user profile for the function to be verified identifying for each succession of input values at least one of the following types of constraint on the succession of input values:

logical constraints;
conditional constraints;
succession constraints;
timing constraints.

Analyzing logical constraints makes it possible to identify cyclic or acyclic inputs: an input is cyclic if, to assign it the value 3, it is necessary to assign it before and afterwards the values 1 and 2. Analyzing conditional constraints makes it possible to identify input values necessary for an input to go to a predetermined value: for example, I1 may be equal to 1 only if I2 is equal to 0. Analyzing the succession constraints makes it possible to identify obligatory successions: for example, I1 goes to 1, then I2 goes to 2, and I3 goes to 0. The timing constraints make it possible to determine a waiting time or a waiting time range necessary for one input value to succeed another. These successions are carried over into the third operation matrix.

Figure 7:
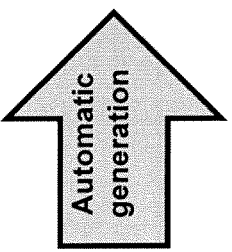
FIG. 7 is a chart showing the operation of formulating an operation matrix linked to past test cases.

The fourth operation matrix (FIG. 7) results from a statistical analysis of data from a database of past test cases relating to the function to be verified. This statistical analysis is oriented to identify the frequency of verification of each succession of input values in past test cases. The database combines all past test cases, possibly classified by function to facilitate their reuse. The statistical analysis is centered on test cases relating to the same function as that to be verified. This database is stored for example in a spreadsheet such as a Microsoft Excel spreadsheet. The formulation of the fourth operation matrix and the statistical analysis are effected by means of a macrocommand developed using a Visual Basic type programming language, for example.

Figure 8:
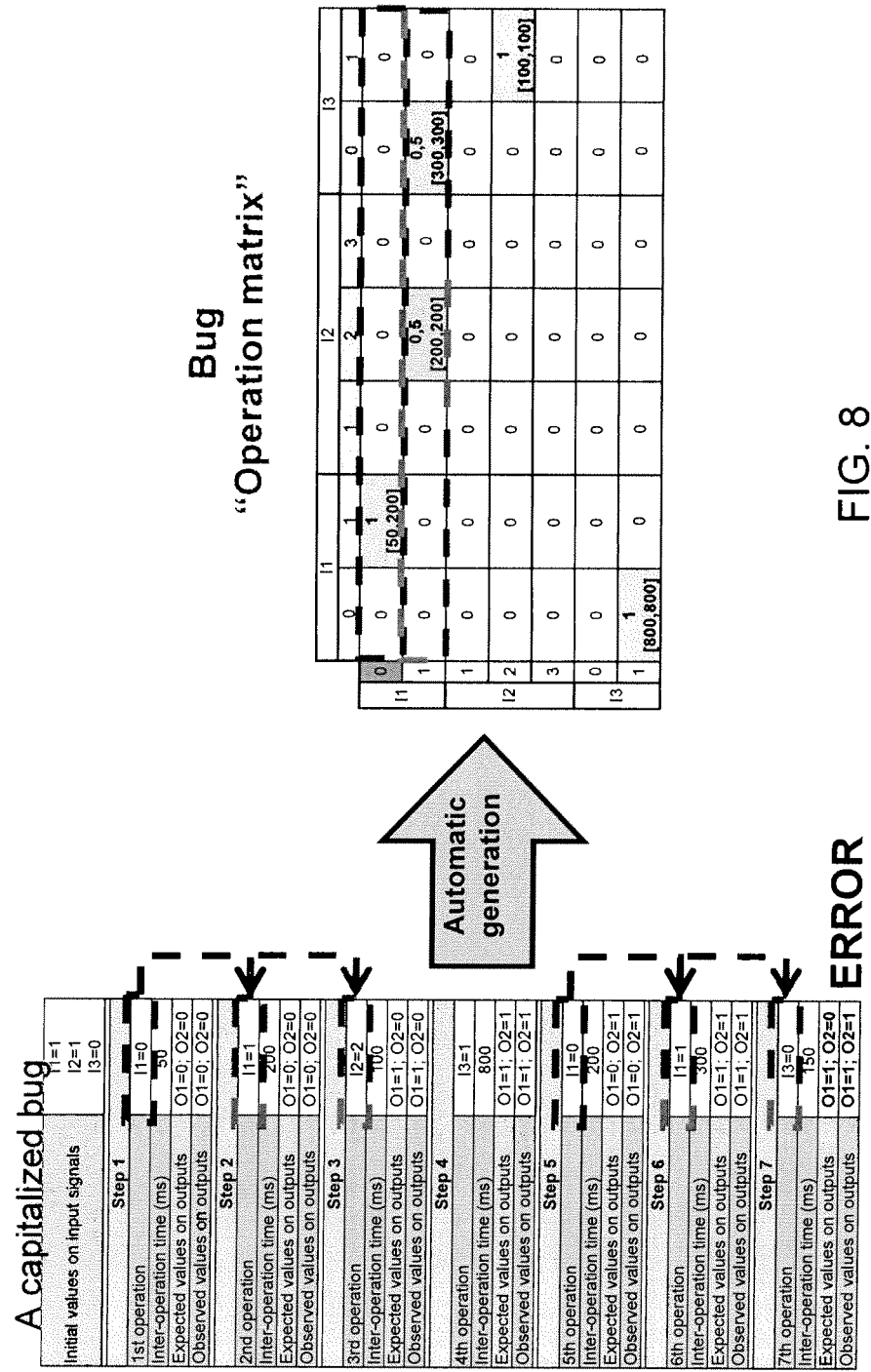
FIG. 8 is a chart showing the operation of formulating an operation matrix linked to past bugs.

The fifth operation matrix (FIG. 8) results from a statistical analysis of data from a database of bugs relating to the function to be verified. This statistical analysis is oriented to identify the frequency of occurrence of the successions of input values in a process of known bugs of the function appearing. The database combines all bugs found in the past with the process that led to them occurring (i.e. the succession of input values with the transition time), possibly classified by function to facilitate their reuse, and with the statistical analysis centered on bugs relating to the same function as that to be verified. This database is stored for example in a spreadsheet such as a Microsoft Excel spreadsheet. The formulation of the fifth operation matrix and the statistical analysis are effected by means of a macrocommand developed using a Visual Basic type programming language, for example.

The five operational matrices may be combined to form a single operation matrix or they may be stored together so that successions can be selected in the five operational matrices.

Figure 9:
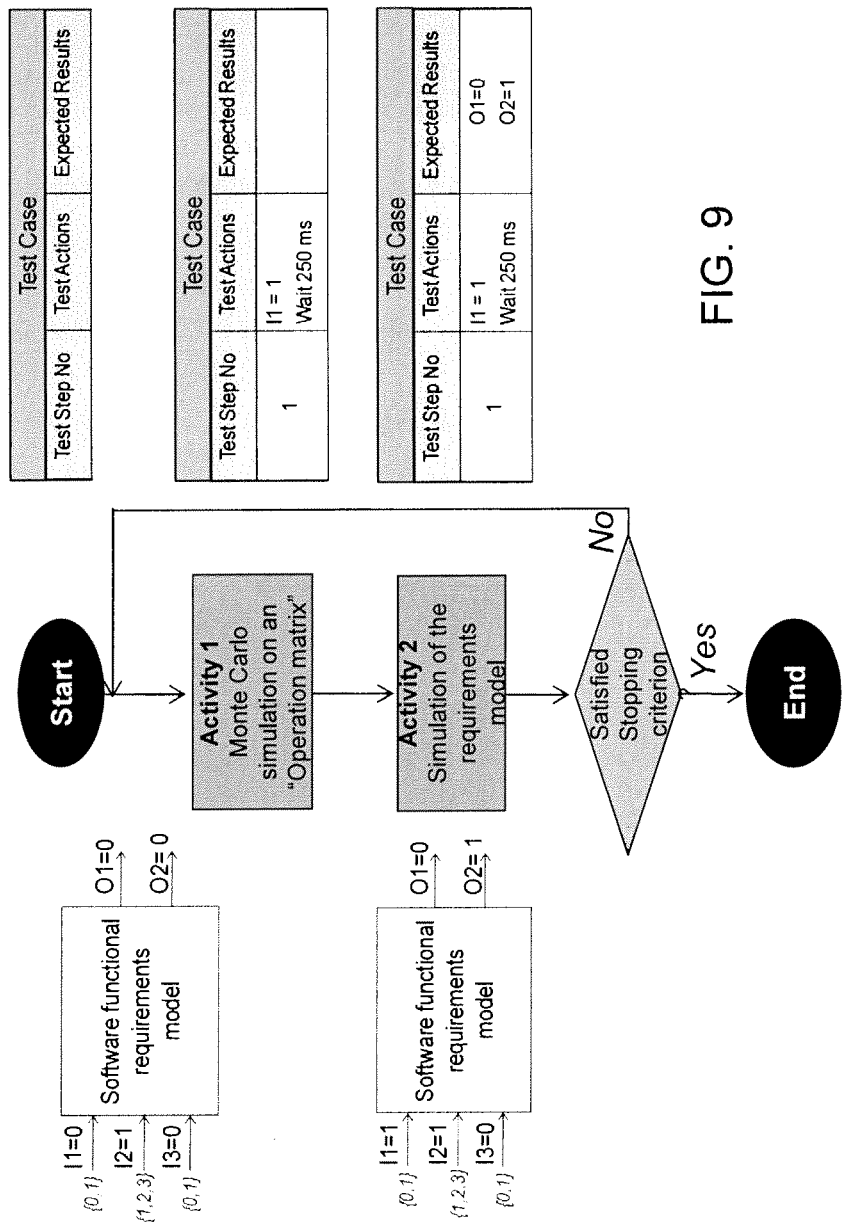
FIG. 9 is a chart showing the process of determining test cases.
Figure 10:
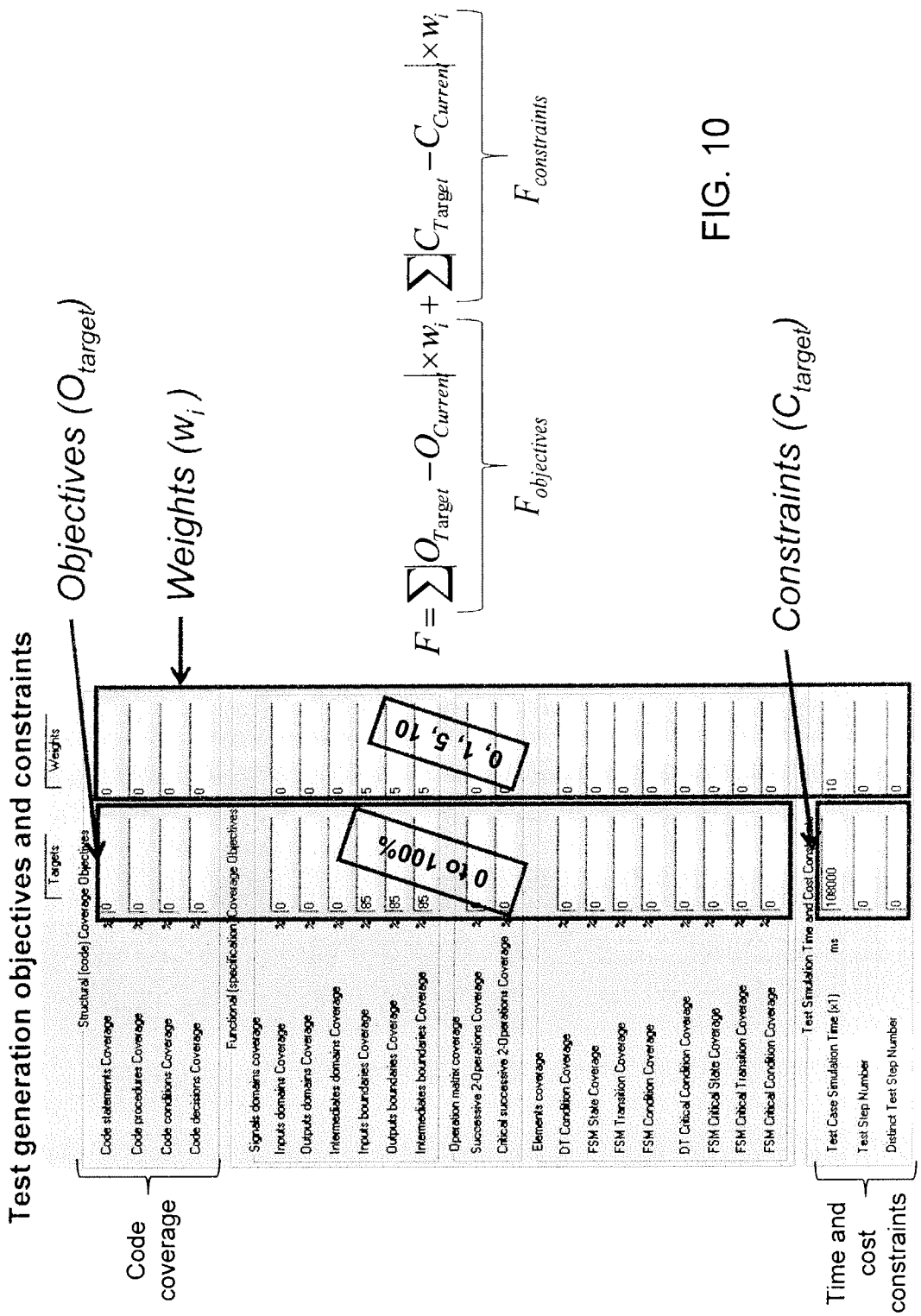
FIG. 10 is a chart showing criteria for stopping the determination of test cases.

The method then includes the steps of selecting the successions of input values to be tested by effecting a Monte Carlo draw on at least one of the operational matrices (here the five operational matrices) and determining a test case including test rows relating each selected succession with the output values expected from the modeled specification (FIG. 9).

The determination process is stopped when the test case being determined makes it possible to reach a predetermined threshold for at least one of the following criteria: verified percentage of function code (amount of code covered by the verification), verified percentage of requirements (coverage of the requirements by the verification), verification time, and verification cost.

Stopping test case determination is determined from a formula (or target function) involving at least some weighted criteria.

Here the Formula is:

$$F=\Sigma(O_{target}-O_{current})\times W_i+\Sigma(C_{target}-C_{current})\times W_i$$

where $O_{target}$ is the percentage threshold (code and requirement) verified, $O_{current}$ is the percentage currently verified by the test case being determined, $C_{target}$ is the time and cost threshold, $C_{current}$ is the time necessary for the verification in the current state of the test case and the actual cost of the verification, and $W_i$ is the weighting applied to the percentages, time and cost, respectively.

FIG. 9 shows an interface enabling the operator to enter the thresholds that they require to reach and the weighting thereof as a function of the importance assigned to them.

Stopping the determination process is preceded by a step of validating each test row against this formula, each test step being retained if it leads to a favorable evolution of the result of the formula. If it does not, this test row is set aside and a new test row is formulated. In the same way, stopping the determination process is preceded by a step of validating each test row which verifies whether the input value tested has been tested already in a previous test row. This constitutes a heuristic algorithm making it possible to optimize determining the test case and making the decision to stop the determination process.

The method preferably includes a configuration step enabling a user to define thresholds of the criteria for stopping the determination process.

During this configuration stage, the operator may further indicate the number of tests to be envisaged after abandoning a test row or a succession to prevent the program executing an endless loop without achieving the set thresholds.

If a plurality of starting configurations of the function may be envisaged for a test case, the step of configuring the method may be adapted to enable the operator to fix the number of starting configurations to be taken into account.

The whole of the method of the invention is implemented by a computer program.

Of course, the invention is not limited to the implementations described and encompasses all variants within the ambit of the invention as defined by the claims.

In particular, an operation matrix may be produced from intermediate operational matrices, for example five operational matrices as described above, that are combined to form the final operation matrix. Of course, the number of intermediate operational matrices may be different and it is possible to produce the final operation matrix without going through any intermediate operation matrix. It is also possible to add an operation matrix, intermediate or not, total or partial, formulated by the operator as a function of their experience and/or specific features of the function.

The process of determining test cases may be stopped as a function of one or more of the above-mentioned criteria or one or more other criteria.

What is claimed is:

1. A non-transitory computer readable storage device storing instructions that, when executed by one or more processors, cause the one or more processors to perform operations comprising:
   distinguishing combinatorial requirements and sequential requirements;
   modeling combinatorial requirements by a truth table and sequential requirements by a finite state machine to obtain a modeled specification;
   establishing an operation matrix relating input values of software with a probability of the input values being in succession and a transition time between the input values;
   selecting the successions of input values to be tested by performing a Monte Carlo draw on the operation matrix;
   determining a test case including test rows relating each selected succession of input values with expected output values based on the modeled specification; and
   stopping the determination process when a determined test case causes at least one of a verified percentage of function code, a verified percentage of requirements, a verification time, or a verification cost to reach a predetermined threshold,
   wherein the test case is for verifying at least one function of a piece of the software in relation to the modeled specification including requirements relating to input values and output values of the software, wherein the test case is automatically formulated.

2. The non-transitory computer-readable storage device according to claim 1, wherein the operation of establishing the operation matrix includes a stage of effecting a statistical analysis of data from a database of software bugs relating to the at least one function to be verified in order to identify a frequency of occurrence of successions of input values in a process of known bugs of the function.

3. The non-transitory computer-readable storage device according to claim 1, wherein the operation of establishing the operation matrix includes a stage of effecting a statistical analysis of data from a database of past test cases relating to the at least one function to be verified in order to identify a frequency of verification of each succession of input values in past test cases.

4. The non-transitory computer-readable storage device according to claim 1, wherein the operation of establishing the operation matrix includes a stage of determining a user profile, for the at least one function to be verified, identifying, for each succession of input values, a constraint on the succession of input values, wherein the constraint on the succession of input values is at least one of a logical constraint, a conditional constraint, a succession constraint, or a timing constraint.

5. The non-transitory computer-readable storage device according to claim 1, wherein the operation of stopping the determination process is determined based on a formula involving weighted criteria.

6. The non-transitory computer-readable storage device according to claim 5 storing instruction that cause the one or more processors to perform operations further comprising:
   validating each test row against said formula, wherein the operation of validating precedes the operation of stopping the determination process, wherein each test step is retained if the test step leads to favorable evolution of a result of the formula.

7. The non-transitory computer-readable storage device according to claim 6 storing instruction that cause the one or more processors to perform operations further comprising:
   validating each test row, wherein the operation of validating precedes the operation of stopping the determination process, wherein the operation of validating verifies whether a tested input value has already been tested in a preceding test row.

8. The non-transitory computer-readable storage device according to claim 1 storing instruction that cause the one or more processors to perform operations further comprising
   enabling, via an interface window, a user to define thresholds of criteria for stopping the determination process.

\* \* \* \* \*